US011902380B1

(12) United States Patent
Galrani et al.

(10) Patent No.: US 11,902,380 B1
(45) Date of Patent: *Feb. 13, 2024

(54) LIVENESS DETECTION FOR AN AUTHENTICATED CLIENT SESSION

(71) Applicant: Juniper Networks, Inc., Sunnyvale, CA (US)

(72) Inventors: Manish Galrani, Bangalore (IN); Nandan Debnath, Bengalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 14 days.

This patent is subject to a terminal disclaimer.

(21) Appl. No.: 17/301,808

(22) Filed: Apr. 15, 2021

Related U.S. Application Data

(63) Continuation of application No. 16/583,838, filed on Sep. 26, 2019, now Pat. No. 10,999,379.

(51) Int. Cl.
*H04L 67/145* (2022.01)
*H04L 67/142* (2022.01)
*H04L 43/0811* (2022.01)
*H04L 9/40* (2022.01)
*H04L 61/103* (2022.01)
(Continued)

(52) U.S. Cl.
CPC ........ *H04L 67/145* (2013.01); *H04L 43/0811* (2013.01); *H04L 61/103* (2013.01); *H04L 61/5014* (2022.05); *H04L 63/0892* (2013.01); *H04L 67/142* (2013.01); *H04L 2101/622* (2022.05)

(58) Field of Classification Search
CPC . H04L 67/145; H04L 67/142; H04L 61/5014; H04L 61/103; H04L 43/0811; H04L 63/0892; H04L 210/622
See application file for complete search history.

(56) References Cited

U.S. PATENT DOCUMENTS 7,587,598 B2   9/2009  Ohba et al.
9,918,353 B2   3/2018  Liang et al.
(Continued)

OTHER PUBLICATIONS

Cheshire S., "IPv4 Address Conflict Detection", Jul. 2008, 21 pages, Retrieved from the Internet [URL: https://tools.ietf.org/html/rfc5227].
Co-pending U.S. Appl. No. 16/583,838, inventor Galrani; Manish, filed Sep. 26, 2019.
Narten T., et al., "Neighbor Discovery for IP version 6 (IPV6)", Sep. 2007, 97 pages, Retrieved from the Internet [URL: https://tools.ietf.org/html/rfc4861].
Rigney C., et al., "Remote Authentication Dial In User Service (RADIUS) RFC2865," Jun. 2000, 76 pages, Retrieved from the Internet [URL: https://tools.ietf.org/html/rfc2865].
(Continued)

*Primary Examiner* — Azizul Choudhury
(74) *Attorney, Agent, or Firm* — Harrity & Harrity, LLP

(57) ABSTRACT

A network node may determine parameters of an authenticated client session for a client device, wherein the parameters comprise a network address of the client device. The network node may determine inactivity of the client device in the authenticated client session. The network node may generate, based on determining the inactivity of the client device, an address resolution protocol (ARP) message or a neighbor solicitation (NS) message to send to the client device, wherein the ARP message or the NS message is to trigger a response from the client device to indicate that the network address of the client device is in use. The network node may provide, toward the client device, the ARP message or the NS message. The network node may perform one or more actions based on receiving or not receiving the response, from the client device, to the ARP message or the NS message.

20 Claims, 12 Drawing Sheets

(51) Int. Cl.
*H04L 61/5014* (2022.01)
*H04L 101/622* (2022.01)

(56) References Cited

U.S. PATENT DOCUMENTS

| | | |
|---|---|---|
| 2003/0037163 A1 | 2/2003 | Kitada et al. |
| 2004/0177276 A1* | 9/2004 | MacKinnon ........ H04L 67/306 |
| | | 726/5 |
| 2005/0080921 A1 | 4/2005 | Lu |
| 2010/0217882 A1 | 8/2010 | Yang |
| 2013/0185416 A1 | 7/2013 | Larkin et al. |
| 2013/0232277 A1 | 9/2013 | Williams |
| 2016/0066263 A1 | 3/2016 | Estevez et al. |
| 2016/0142508 A1* | 5/2016 | Ishihara ............. H04L 43/0811 |
| | | 370/236 |

OTHER PUBLICATIONS

Thomson S., et al., "IPv6 Stateless Address Autoconfiguration", Dec. 1998, 25 pages, Retrieved from the Internet [URL: https://tools.ietf.org/html/rfc2462].

* cited by examiner

500 ⟶

510 — Determining parameters of an authenticated client session for a client device with a dynamic host configuration protocol (DHCP) server, wherein the parameters comprise a network address of the client device and an indication of a network layer protocol of the authenticated client session 520 — Generating, based on the indication of the network layer protocol of the authenticated client session, an address resolution protocol (ARP) message to send to the client device; wherein the ARP message identifies the network address of the client device as a target network address, and wherein the ARP message is to trigger a response from the client device to indicate that the network address of the client device is in use 530 — Providing, to the client device, repetitions of the ARP message at a periodicity having a period that is less than an age-out period, wherein the age-out period corresponds to an amount of time of inactivity after which the one or more processors are to remove the parameters of the authenticated client session 540 — Performing one or more actions based on a receipt of, or a failure to receive, the response to the ARP message from the client device

FIG. 5

LIVENESS DETECTION FOR AN AUTHENTICATED CLIENT SESSION

RELATED APPLICATION

This application is a continuation of U.S. patent application Ser. No. 16/583,838, filed Sep. 26, 2019, which is incorporated herein by reference in its entirety.

BACKGROUND

Some network providers require a client device to be authenticated before the network provider allows the client device to access a network. An authentication process includes exchanges of information for the client device to receive authentication. Once authenticated, a network node may establish an authenticated client session, for the client device, and store parameters of the authenticated client session within a data structure. The network node may maintain the authenticated client session as long as the client device is active in the network. If the network node becomes inactive, the network node may remove the parameters of the authenticated client session from the data structure. If the parameters of the authenticated client session are removed, the client device may need to be authenticated again before reconnecting to the network.

SUMMARY

According to some implementations, a method may include determining, by a network node, parameters of an authenticated client session for a client device with a dynamic host configuration protocol (DHCP) server, wherein the parameters comprise a network address of the client device; determining, by the network node, inactivity of the client device in the authenticated client session, wherein the inactivity is based on a failure of the client device to transmit data via the authenticated client session for a period of time; generating, by the network node and based on determining the inactivity of the client device, an address resolution protocol (ARP) message or a neighbor solicitation (NS) message to send to the client device, wherein the ARP message or the NS message identifies the network address of the client device as a target network address, and wherein the ARP message or the NS message is to trigger a response from the client device to indicate that the network address of the client device is in use; providing, by the network node and toward the client device, the ARP message or the NS message; and performing, by the network node, one or more actions based on receiving or not receiving the response, from the client device, to the ARP message or the NS message.

According to some implementations, a network node may include one or more memories; and one or more processors to: determine parameters of an authenticated client session for a client device with a DHCP server, wherein the parameters comprise a network address of the client device and an indication of a network layer protocol of the authenticated client session; generate, based on the indication of the network layer protocol of the authenticated client session, an ARP message to send to the client device, wherein the ARP message identifies the network address of the client device as a target network address, and wherein the ARP message is to trigger a response from the client device to indicate that the network address of the client device is in use; provide, to the client device, repetitions of the ARP message at a periodicity having a period that is less than an age-out period, wherein the age-out period corresponds to an amount of time of inactivity after which the one or more processors are to remove the parameters of the authenticated client session; and perform one or more actions based on a receipt of, or a failure to receive, the response to the ARP message from the client device.

According to some implementations, a non-transitory computer-readable medium may store one or more instructions. The one or more instructions, when executed by one or more processors of a network node, may cause the one or more processors to: determine parameters of an authenticated client session for a client device with a DHCP server, wherein the parameters comprise a network address of the client device and an indication of a network layer protocol of the authenticated client session; generate, based on the indication of the network layer protocol of the authenticated client session, an NS message to send to the client device, wherein the NS message identifies the network address of the client device as a target network address, and wherein the NS message is to trigger a response from the client device to indicate that the network address of the client device is in use; provide, to the client device, repetitions of the NS message at a periodicity having a period that is less than an age-out period, wherein the age-out period corresponds to an amount of time of inactivity after which the one or more instructions, when executed by the one or more processors, cause the one or more processors to remove the parameters of the authenticated client session; and perform one or more actions based on a receipt of, or a failure to receive, the response to the NS message from the client device.

BRIEF DESCRIPTION OF THE DRAWINGS

FIGS. 4-6 are flowcharts of example processes for detecting liveness of an authenticated client session.

DETAILED DESCRIPTION

Figure 1A:
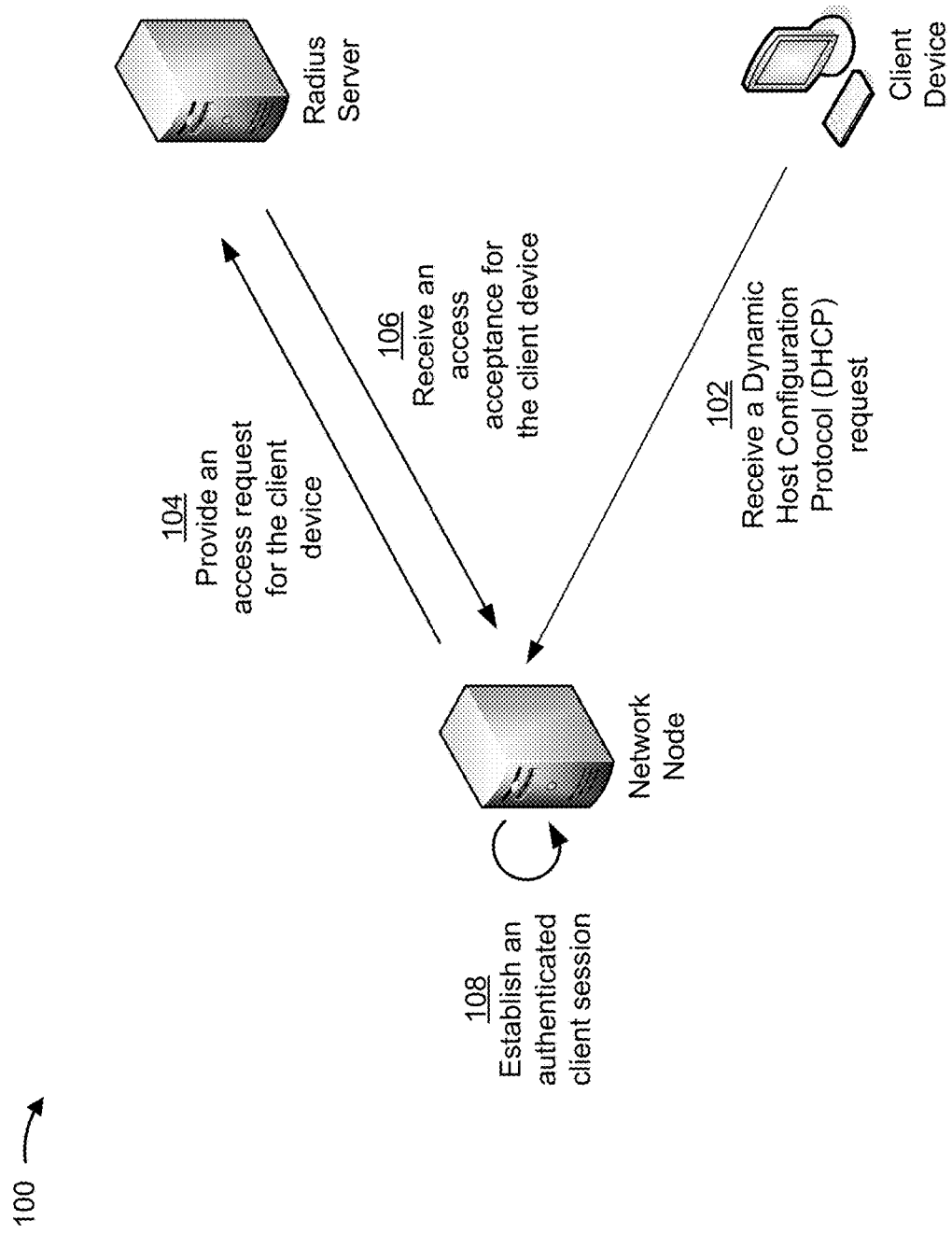
FIGS. 1A-IF are diagrams of one or more example implementations described herein.

The following detailed description of example implementations refers to the accompanying drawings. The same reference numbers in different drawings may identify the same or similar elements.

A client device may connect to a network node (e.g., an access switch) for authentication to connect to a network. After the network node successfully authenticates the client device, the client device may receive a network address (e.g., an internet protocol (IP) address) from a network protocol server, such as a Dynamic Host Configuration Protocol (DHCP) server, with a lease time (e.g., a few days) and the client device may be connected to the network during the lease time.

The network node may maintain an authenticated client session for the client device in a data structure. The network node may also determine parameters of the authenticated client session (e.g., a time of authentication, a media access control (MAC) address of the client device) to associate with the authenticated client session in the data structure (e.g., a filtering database, a forwarding database, a forwarding table, a MAC table, and/or the like). After successful authentication, if the client device does not communicate via the network for a period of time (e.g., a MAC age-out time for the network node), the network node may remove the authenticated client session from the data structure. After removal by the network node, if the client device attempts to renew a network address, the attempt may fail because the client device is removed from the data structure and the renewal is dropped at the network node. To reconnect to the network and renew the network address, the client device would need to reauthenticate via the network node.

The process for removing inactive client devices from the data structure helps to maintain an updated record of connected devices that are accessible via the network. However, the client device may be a passive client device (e.g., a printer, scanner, scale, and/or the like) that, once connected to the network, does not initiate communications without first receiving a communication from another device on the network. This means that the network node may determine that the client device is inactive based on a failure to transmit data via the network even though the client device is a passive client device waiting to receive a communication from another device on the network. Because the network node determines the inactivity of the client device, the network node may remove the parameters associated with the authenticated client session from the data structure and the client device would need to reauthenticate to access the network. Additionally, when another device attempts to provide a command, the command may fail because the printer is unreachable on the network.

This disclosure relates to systems and methods for detecting a liveness of a client device. The network node may probe an inactive client device before removing parameters of an associated authenticated client session. The network node may provide a message that triggers a response from the client device to indicate that the network address of the client device is in use. The message may be an address conflict detection (ACD) message (e.g., an address resolution protocol (ARP) message), a duplicate address detection (DAD) message (e.g., a neighbor solicitation (NS) message), and/or the like. Based on whether or not the network node receives a response from the client device, the network node may perform an action such as maintaining the parameters of the authenticated client session in the data structure, providing another message to trigger the response, removing the parameters of the authenticated client session, and/or the like.

Because the network node provides the message to trigger a response from the client device that is a passive client device, the passive device may respond to the message, which can prevent removal of the parameters of the authenticated client sessions. In this way, the network node may conserve computing resources (e.g., processor resources, memory resources, communication resources, and/or the like) of the network node, the client device, a DHCP server, and/or other network devices, which may otherwise be used in a process to reauthenticate the client device. Additionally, the network node may conserve network resources that may otherwise be used during a reauthentication process for the client device.

FIGS. 1A-1F are diagrams of one or more example implementations 100 described herein. As shown in FIGS. 1A-1F, the example implementation(s) 100 may include a network node, a client device, a radius server, a DHCP server, a MAC-radius/MAC authentication bypass (MAB) client, a network access switch/network access control (NAC), a radius server, and/or the like. The network node, network access switch/NAC, and/or other included devices may comprise hardware, firmware, or a combination of hardware and software and may be, for example, switches, routers, servers, security devices, devices implementing virtual machines, cloud computing resources, and/or the like.

The network node may comprise an access switch configured as an authenticator for devices attempting to connect to the network. The client device may comprise an 801.1x client device (supplicant), a captive-portal client device, a MAC-radius client device, a MAC-authentication-bypass client device, a client device that does not support 802.1x authentication, and/or the like. If the client device does not support 802.1x protocol, the network node may facilitate authentication of the client device via the radius server.

As shown in FIG. 1A, and by reference number 102, the network node may receive a DHCP request from the client device. The DHCP request may request access to the network and may request a network address from a DHCP server. If the network node determines that the client device has already been authenticated, the DHCP request may be forwarded (e.g., by the network node, another network device, and/or the like) to a DHCP server. If the network node determines that the client device is not yet authenticated, the network node may perform an authentication process (e.g., a MAC-authentication-bypass) with another network device, such as a radius server.

As shown by reference number 104, the network node may provide an access request to a radius server that requests authentication based on the MAC address of the client device. The radius server may be provisioned to authenticate the client device based on the MAC address for the client device. The radius server may determine to accept the access request based on the MAC address matching a MAC address of a set of MAC addresses approved for authentication. In some implementations, the radius server may be provisioned with the set of MAC addresses approved for authentication. The radius server may be provisioned via a device associated with zero-touch provisioning, a device associated with a network administrator, and/or the like.

As shown by reference number 106, the radius server may provide, to the network node, an access acceptance for the client device. The acceptance indicates that the radius server authorizes the network node to establish an authenticated client session for the client device. The radius server may also provide instructions (e.g., vendor specific attributes (VSAs) and/or the like) for removing parameters associated with the client device from the data structure if the client device becomes inactive, for providing messages to inactive client devices to trigger a response, and/or the like. For example, a VSA may instruct the network node to provide an ARP message or an NS message based on determining the inactivity of the client device. The VSA may provide instructions regarding conditions to trigger the ARP message or the NS message, a periodicity at which to provide the ARP message or the NS message, and/or the like.

As shown by reference number 108, the network node may establish the authenticated client session based on receiving the access acceptance for the client device. The network node, another network device, and/or the like may then forward, to the DHCP server, the DHCP request or a new DHCP request from the client device.

As part of establishing the authenticated client session, the network node may maintain parameters of the authenticated client session in a data structure such as a filtering data structure, a forwarding data structure, a MAC-radius data structure, and/or the like. The parameters may include instructions from any VSAs associated with the client device, a MAC address of the client device, and/or the like.

Other examples of authenticating a client device to establish an authenticated client session may include a captive-portal client authentication process and/or the like. For a captive-portal device, the network node or the DHCP server may receive credentials, an indication of acceptance of a service agreement, and/or the like from the client device. If the client device provides the required information (e.g., via a website), the network node may authenticate the client device, and the client device may access the network based on an authenticated client session stored in the data structure of the network node.

Figure 1B:
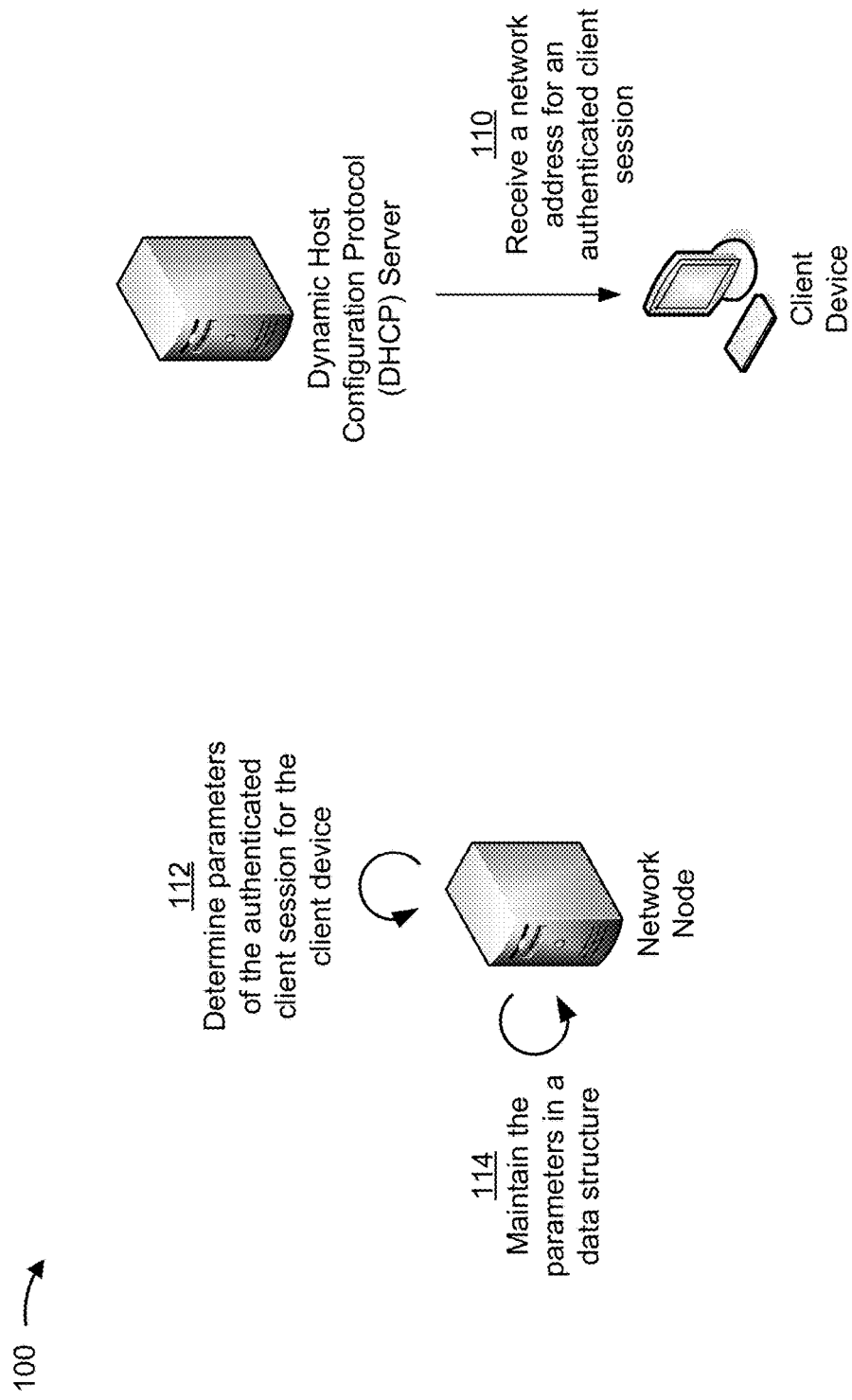

As shown in FIG. 1B, and by reference number 110, the client device may receive a network address for the authenticated client session from the DHCP server. The network address may be associated with an internet protocol, such as internet protocol version 4 (IPv4), internet protocol version 6 (IPv6), and/or the like. In some implementations, the client device receives the network address via the network node, another network device, and/or the like. For example, the client device may receive the network address via one or more routers, switches, and/or the like, which may include a router connected to a local area network with the client device.

As shown by reference number 112, the network node may determine parameters of the authenticated client session for the client device with the DHCP server. In some implementations, the network node determines parameters including the network address of the client device, a network layer protocol of the authenticated client session, and/or the like to store with other parameters of the authenticated client session. The network node may be able to determine parameters of the authenticated client session via a snooping process. In some implementations where the client device is an IPv4 client device, the snooping process may include DHCP snooping. In some implementations where the client device is an IPv6 client, the snooping process may include DHCP snooping (e.g., DHCP version 6 snooping), stateless address auto-configuration snooping (SLAAC snooping), and/or the like. When using SLAAC snooping, one or more network nodes may perform or assist in snooping DHCP transactions.

As shown by reference number 114, the network node may maintain the parameters in the data structure. In some implementations, the network node generates an entry for the authenticated client session within the data structure. The entry may include identifying information for the client device (e.g., as the MAC address of the client device), the network address assigned to the client device by the DHCP server (e.g., an IP address), a network layer protocol associated with the authenticated client session, a timing of one or more communication activities of the client device over the network, VSAs associated with the authenticated client session, and/or the like.

Figure 1C:
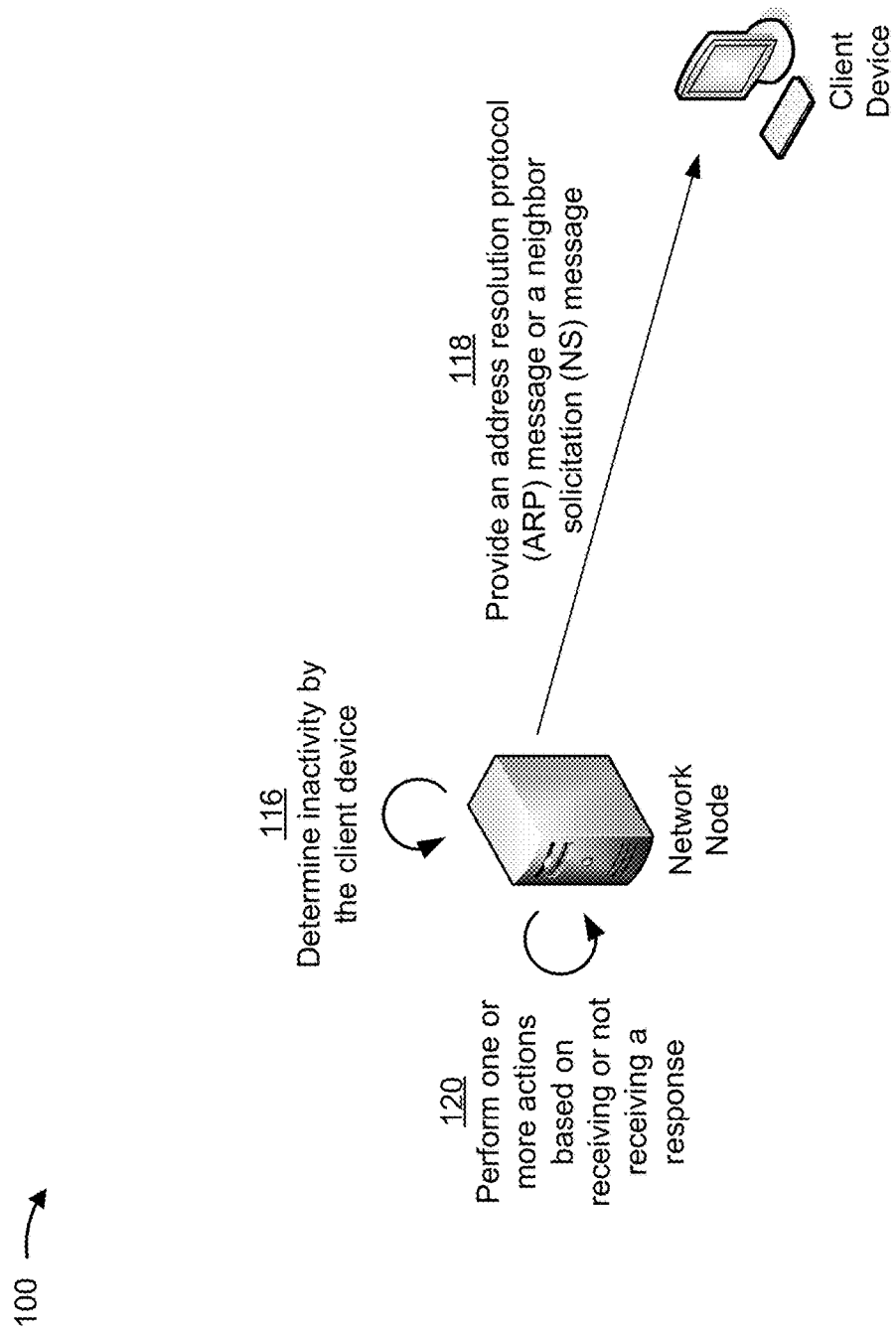

As shown in FIG. 1C, and by reference number 116, the network node may determine inactivity by the client device. For example, the network node may determine that an amount of time since a most recent transmission by the client device has exceeded a threshold. The amount of time may be less than a period of time (e.g., a MAC age-out time) after which the network node is triggered to remove the parameters from the data structure.

As shown by reference number 118, the network node may provide a message that triggers a response from the client device to indicate that the network address of the client device is in use. The message may be an ACD message (e.g., an ARP message and/or the like), a DAD message (e.g., an NS message and/or the like), and/or the like. These messages may be used when extensible authentication protocol (EAP) communications are not available (e.g., because the client device is not configured for 802.1x protocol communications). In some implementations, the network node generates and provides an ARP message based on determining that the network layer protocol associated with the network address of the client device is IPv4. In some implementations, the network node generates and provides an NS message based on determining that the network layer protocol associated with the network address of the client device is IPv6.

In some implementations, the network node provides the message to trigger the response from the client device based on determining inactivity by the client device. In some implementations, the network node may provide the message without dependence on determining inactivity. For example, the network node may provide the message based on conditions for sending the message as defined in a VSA from the radius server. In some implementations, the VSA may identify one or more connected client devices which the network node is to provide with an ACD message and/or a DAD message to detect liveness. In some implementations, the VSA may identify the one or more client devices based on one or more identifiers of the one or more client devices, based on one or more ports through which the one or more client devices are connected, based on the one or more client devices being connected to the network (e.g., the VSA may identify all client devices connected to the network), and/or the like.

An ARP message may include an ARP probe that may be used in an IPv4 network to determine if a network address is already in use within the network before claiming the network address for another device on the network. The network node may transmit the ARP probe as a broadcast frame using a broadcast network address (e.g., 00:00:00:00:00:00) as a destination MAC address within the probe. This way, the ARP probe may be read by any device on the network. The ARP probe identifies the network address of the client device as a target network address. The ARP probe may identify a sender network address as a broadcast network address (e.g., 0.0.0.0) so that the network node may receive a response from the client device. The ARP probe triggers the client device to respond to indicate that the network address is in use and is therefore unavailable for assignment to another device.

An NS message may be used in an IPv6 network for duplicate address detection, address resolution, device discovery, and/or the like. The network node may transmit the NS message as a multi-cast message or a unicast message. The source address of the NS message may be identified as an unspecified address (e.g., ::). The target address may be identified as the network address of the client device.

The NS message triggers a response from the client device. The response may include a neighbor advertisement message. A source address in the neighbor advertisement message may be identified as the network address of the client device. The destination address in the neighbor advertisement message may be identified as the network address of the network node.

As shown by reference number 120, the network node may perform one or more actions based on receiving or not receiving a response from the client device.

Figure 1D:
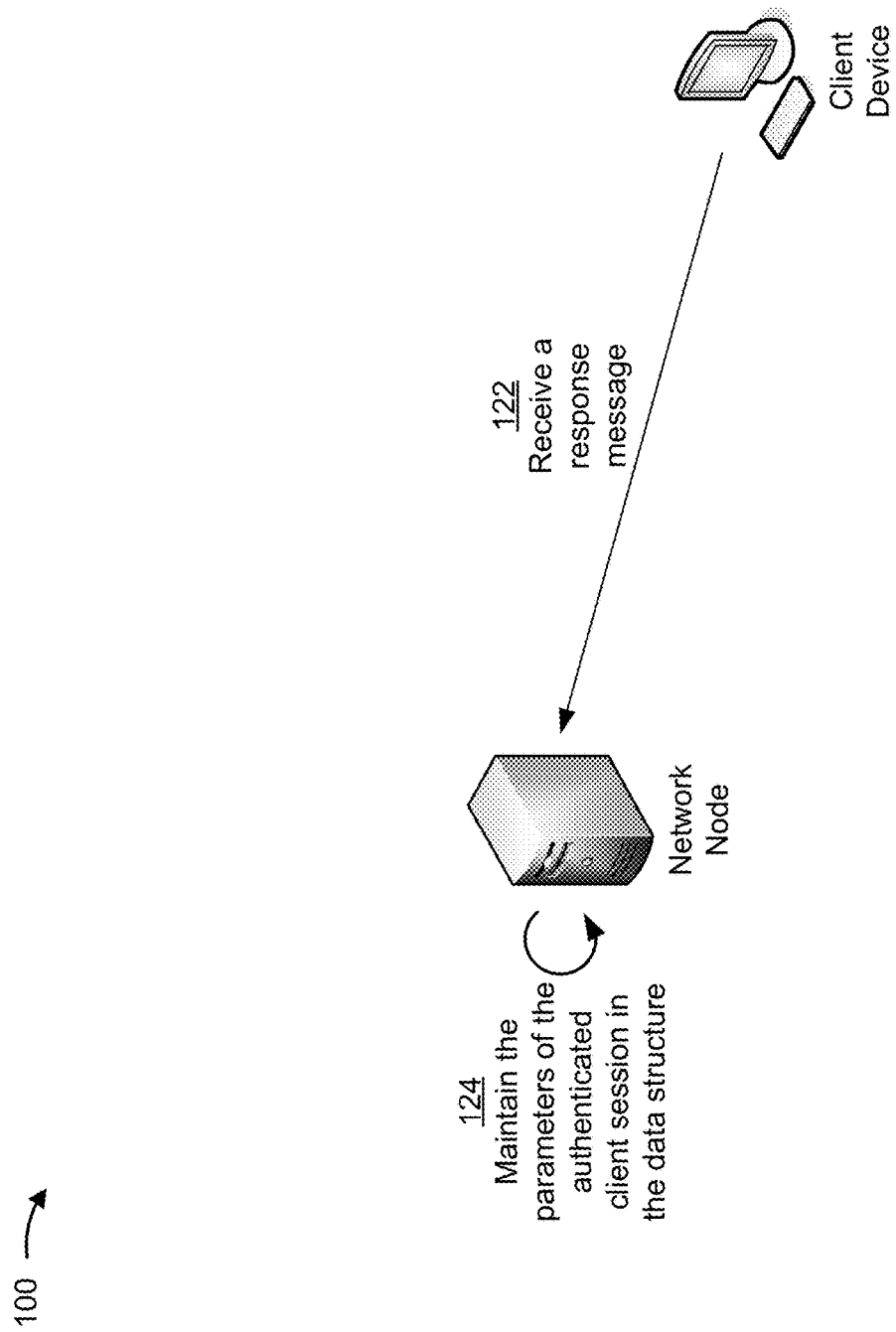

As shown in FIG. 1D, and by reference number 122, the network node may receive a response message from the client device. The response may be a response to an ARP message to indicate that the network address assigned to the client device is not available. The response may be a response to the NS message (e.g., the neighbor advertisement message) to indicate that the client device is reachable by the network node.

As shown by reference number 124, the network node may maintain the parameters of the authenticated client session within the data structure. For example, based on the network node receiving the response, the network node may determine that the authenticated client session for the client device should not be removed, that the client device should remain authenticated, and that the parameters should be maintained within the data structure. In some implementations, the response includes the network address and/or the MAC address of the client device, which the network node may use to identify the client device.

By maintaining the parameters within the data structure, and thereby maintaining the authentication for the client device, the network node may avoid unnecessarily causing the client device to reauthenticate. In this way, the network node may conserve computing resources of the network node, the client device, a DHCP server, and/or other network devices, which may otherwise be used in a process to reauthenticate the client device. Additionally, the network node may conserve network resources that may otherwise be used during a reauthentication process for the client device. Further, if another device on the network provides a command to the client device, such as a print command, a DHCP renew request, magic packet for Wake-on-LAN, and/or the like, the command may not be dropped at the network node or an associated device (e.g., a router and/or an access switch). This may conserve computing and/or network resources that might otherwise be consumed for trouble shooting the failure to deliver the command to the client device.

Figure 1E:
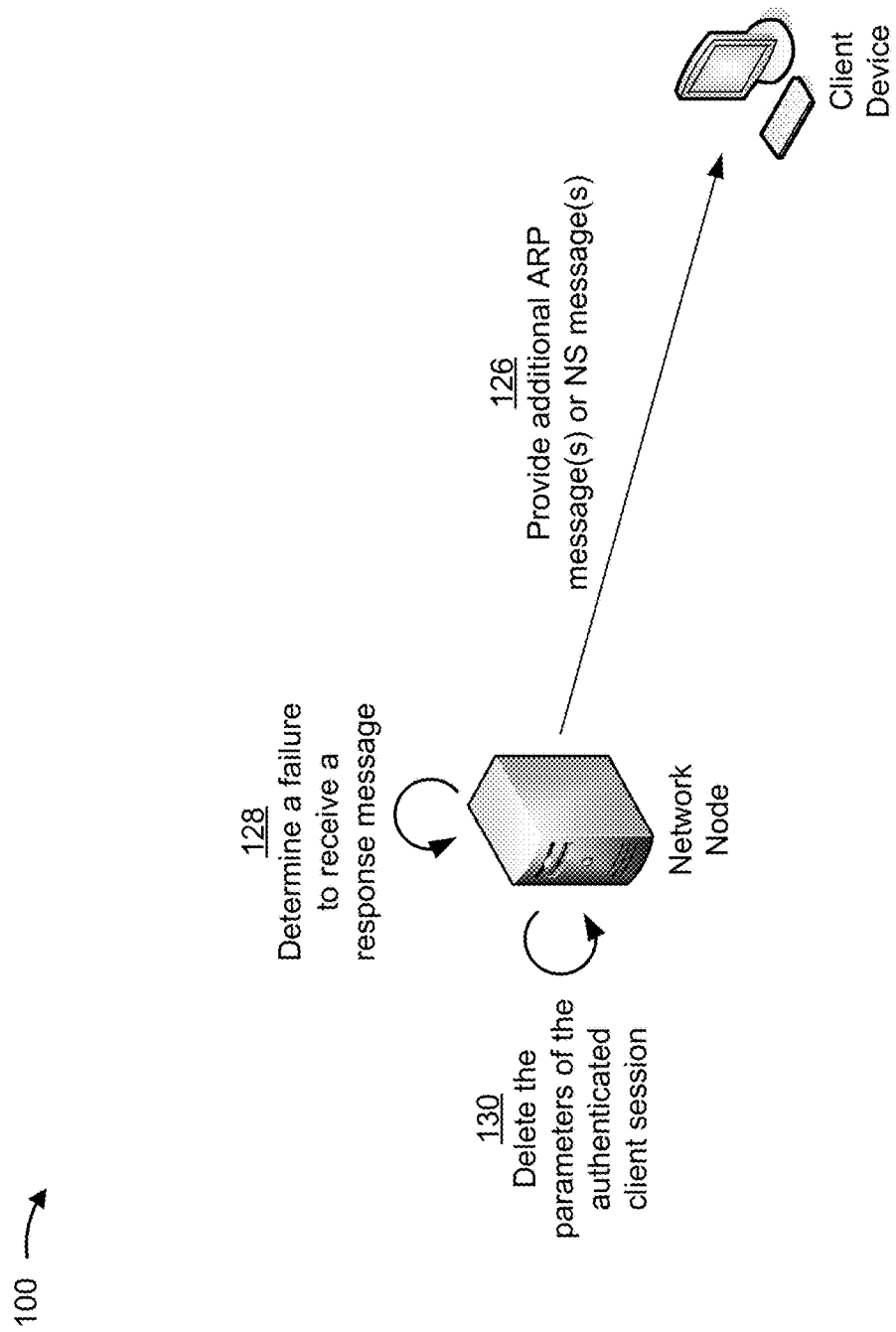

As shown in FIG. 1E, and by reference number 126, the network node may provide one or more additional ARP messages and/or one or more additional NS messages to the client device. In some implementations, the network node may provide, with a periodicity, the ARP message and the one or more additional ARP messages or the NS message and the one or more additional NS messages. In some implementations, the periodicity may be configured by the radius server (e.g., via a VSA and/or the like). The periodicity may have a period that is less than an age-out period (e.g., a MAC age-out time). In some implementations, the periodicity may be less than half of the age-out period such that the network node may provide two or more ARP messages or NS messages to the client device within a particular age-out period.

As shown by reference number 128, the network node may determine a failure to receive a response message from the client device. For example, the network node may determine that the network node has not received a response to the ARP message or NS message and has not received a response to the one or more additional ARP messages or to the one or more additional NS messages.

In some implementations, the network node may determine that the parameters associated with the authenticated client session are to be removed based on the network node failing to receive a response from the client device after providing a predetermined quantity of ARP messages or NS messages (e.g., a configurable max-probe count). The predetermined quantity may be provided by the radius server (e.g., via a VSA or the like).

In some implementations, the network node may determine that the client device has failed to respond to the ARP message and/or one or more additional ARP messages, or the NS message and/or one or more additional NS message(s), within a predetermined amount of time from when the network node provided the ARP message(s) or NS message(s). If the network node does not receive a response within the predetermined amount of time for a predetermined quantity of consecutive probes, then a failure action may be implemented at the network node. The failure action may include the network node removing the parameters associated with the authenticated client session, providing another ARP message or NS message, and/or the like.

As shown by reference number 130, the network node may delete the parameters associated with the authenticated client session based on the failure to receive a response message from the client device.

Using the systems and methods described herein, the network node may maintain the parameters associated with an authenticated client session (e.g., a MAC entry) within a data store (e.g., a MAC table) until the network node provides the client device at least one opportunity to respond to an ARP and/or NS message. In this way, the network node may avoid removing parameters associated with an authenticated client session for a client device that is still connected to the network. The network node may thus conserve computing resources of the network node, the client device, a DHCP server, and/or other network devices, which may otherwise be used in a process to reauthenticate the client device. Additionally, the network node may conserve network resources that may otherwise be used during a reauthentication process for the client device. Further, the network node may still remove parameters associated with an authenticated client session for a client device that is no longer connected to the network. This may reduce computing resources and network resources consumed by the network node related to maintaining the data structure with an unnecessarily large amount of data for authenticated client sessions for client devices that are, or were, authenticated even though some of the client devices are no longer connected to the network.

Figure 1F:
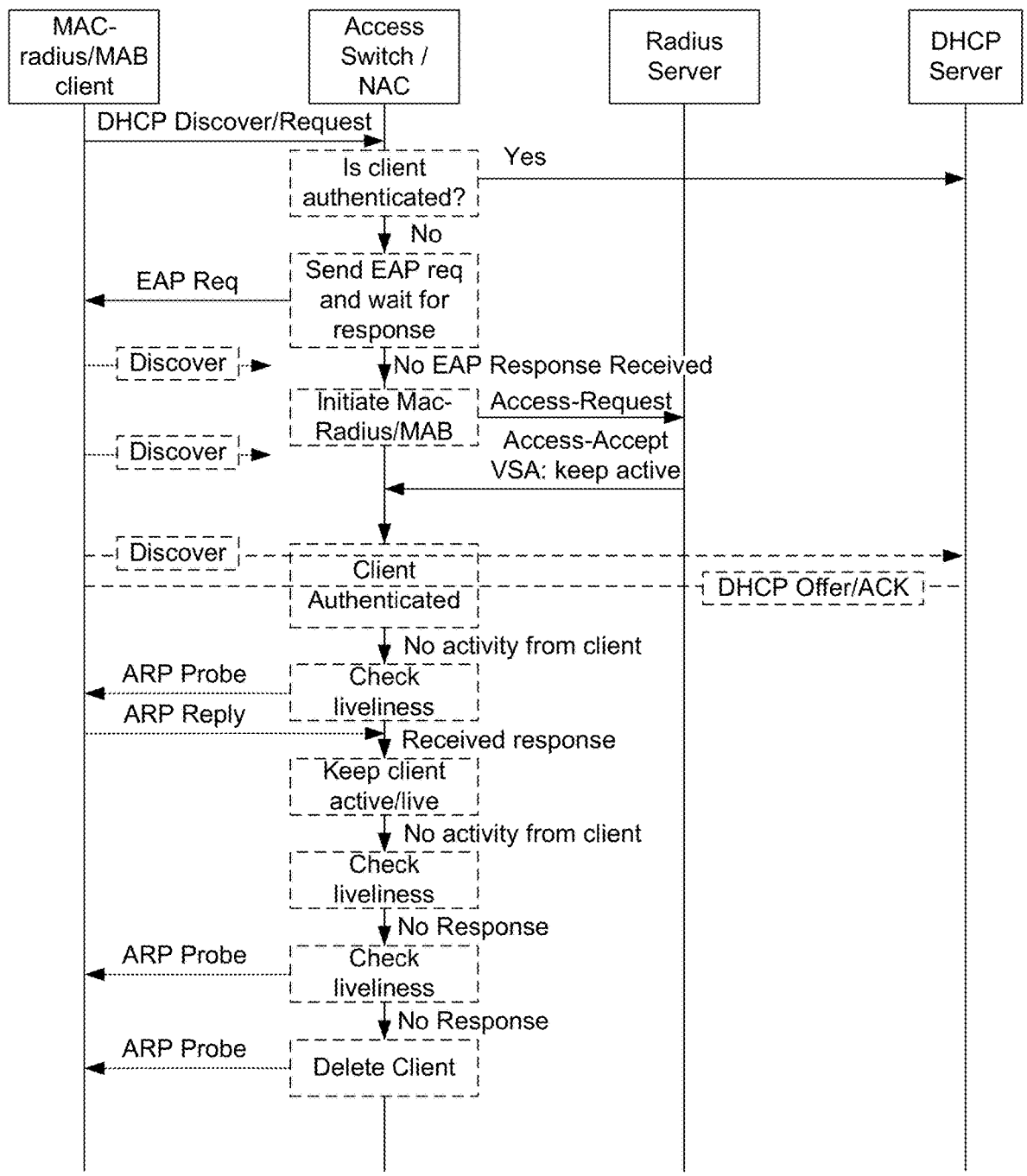

FIG. 1F shows a call flow diagram that illustrates one or more aspects of example implementation(s) 100 describes above. The call flow diagram shows operations performed by network devices including a MAC-radius/MAB client device, an access switch/NAC network node, a radius server, and a DHCP server. The MAC-radius/MAB client device may provide a DHCP Discover/Request toward the DHCP server via the access switch/NAC network node. The access switch/NAC network node may determine if the MAC-radius/MAB client device is already authenticated. If the MAC-radius/MAB client device is already authenticated, the access switch/NAC may forward the DHCP Discover/Request to the DHCP server. If the MAC-radius/MAB client device is not yet authenticated, the access switch/NAC may send an EAP request to the MAC-radius/MAB client device and wait for a response. If the access switch/NAC does not receive an EAP response (e.g., because the MAC-radius/MAB client is not configured for EAP communications), the access switch/NAC may initiate a MAC-radius/MAB authentication process.

The MAC-radius/MAB authentication process may include providing an Access-Request to the radius server. As described above, the radius server may determine if the radius server has been provisioned to authenticate the MAC-radius/MAB client based on a MAC address of the MAC-radius/MAB client. The radius server may provide an Access-Accept to the access switch/NAC. The radius server may also provide one or more VSAs to instruct the access switch/NAC regarding providing ARP messages, NS messages, and/or the like. The access switch/NAC may authenticate the MAC-radius/MAB client and maintain parameters related to an authenticated client session within a data structure. The access switch/NAC may receive another DHCP Discover/Request from the MAC-radius/MAB client, determine that the MAC-radius/MAB client is authenticated, and forward the DHCP Discover/Request to the DHCP server.

After a period of no activity from the MAC-radius/MAB client, the access switch/NAC may check liveliness of the MAC-radius/MAB client by providing an ARP probe to the MAC-radius/MAB client. If the access switch/NAC receives a response from the MAC-radius/MAB client, the access switch/NAC may keep the client active/live by maintaining the parameters associated with the authenticated client session within the data store. If the access switch/NAC fails to receive a response from the MAC-radius/MAB client, the access switch/NAC may provide another ARP probe to the MAC-radius/MAB client. After a predetermined quantity of ARP probes and/or a predetermined amount of time, the access switch/NAC may delete the client by removing the parameters associated with the authenticated client session.

As indicated above, FIGS. 1A-1F are provided merely as one or more examples. Other examples may differ from what is described with regard to FIGS. 1A-1F.

Figure 2:
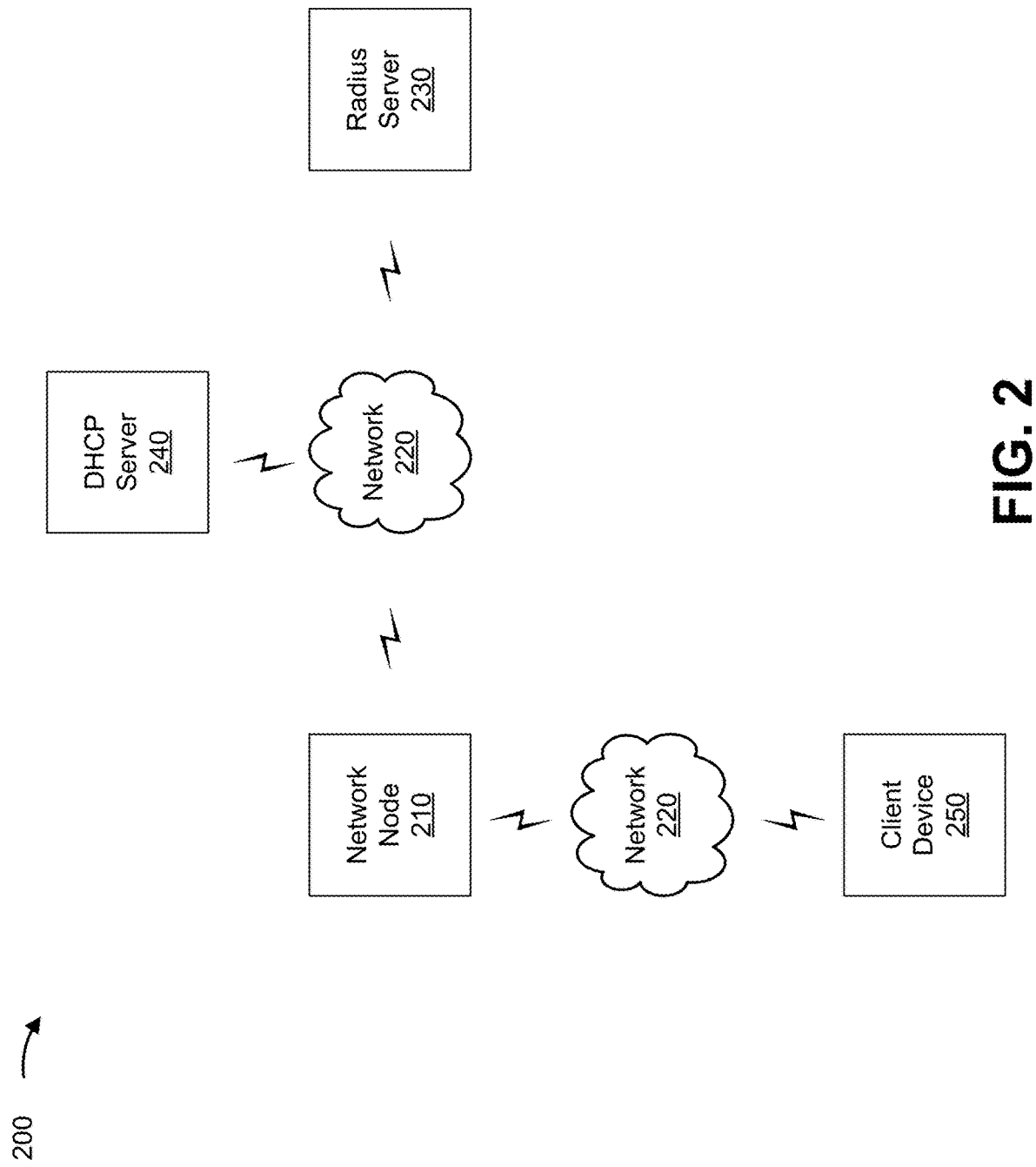
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network node 210, one or more networks 220 (referred to herein individually as network 220 or collectively as networks 220), a radius server 230, a DHCP server 240, and a client device 250. Devices of environment 200 may interconnect via wired connections, wireless connections, or a combination of wired and wireless connections.

Network node 210 includes one or more devices capable of receiving, storing, generating, processing, forwarding, and/or transferring information, such as data packets. For example, network node 210 may include a switch (e.g., an access switch or NAC), a router, a security device, one or more devices implementing virtual machines, cloud computing resources, a gateway, a bridge, a network interface controller (NIC), and/or the like. In some implementations, network node 210 may be a physical device implemented within a housing, such as a chassis. In some implementations, network node 210 may be a virtual device implemented by one or more computer devices of a cloud computing environment or a data center.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Radius server 230 includes one or more devices capable of receiving, storing, generating, processing, forwarding, and/or transferring information associated with authenticating MAC-radius client devices. In some implementations, radius server 230 may be hosted in a cloud computing environment. In some implementations, radius server 230 may include a server device (e.g., a host server, a web server, an application server, and/or the like), a data center device, or a similar device.

DHCP server 240 includes one or more devices capable of receiving, generating, storing, processing, and/or providing information associated with a data service. For example, DHCP server 240 can include a computing device, such as a server device (e.g., a host server, a web server, an application server, and/or the like), a data center device, or a similar device. In some implementations, DHCP server 240 can provide a network address to the client device 250.

Client device 250 includes one or more devices capable of receiving, generating, storing, processing, and/or providing information associated with communication via the network 220. For example, client device 250 may include a communication and/or computing device, such as printer, a scale, a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
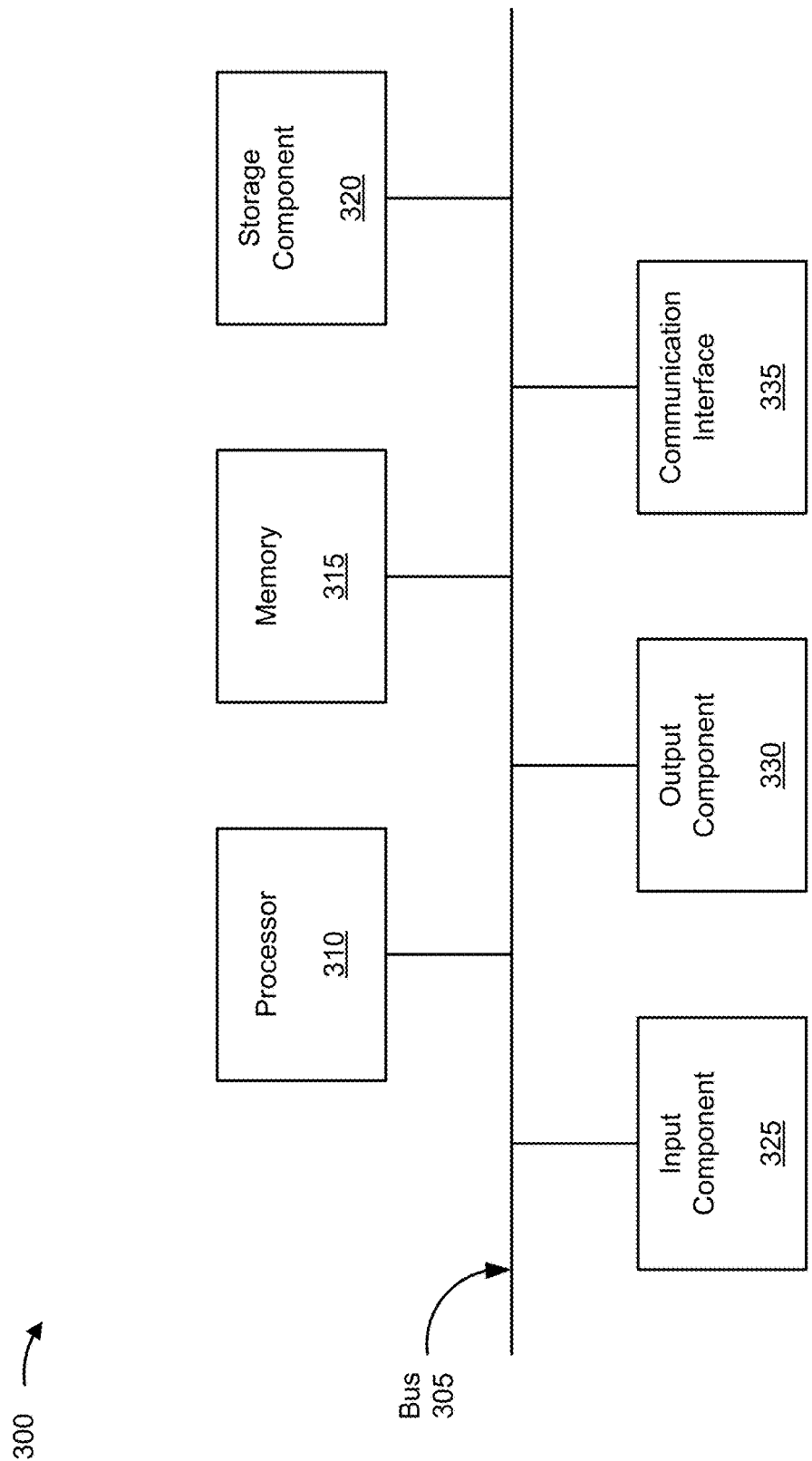
FIGS. 3A and 3B are diagrams of example components of one or more devices of FIG. 2.

FIG. 3A is a diagram of example components of a device 300. Device 300 may correspond to network node 210, radius server 230, DHCP server 240, and/or client device 250. In some implementations, network node 210, radius server 230, DHCP server 240, and/or client device 250 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
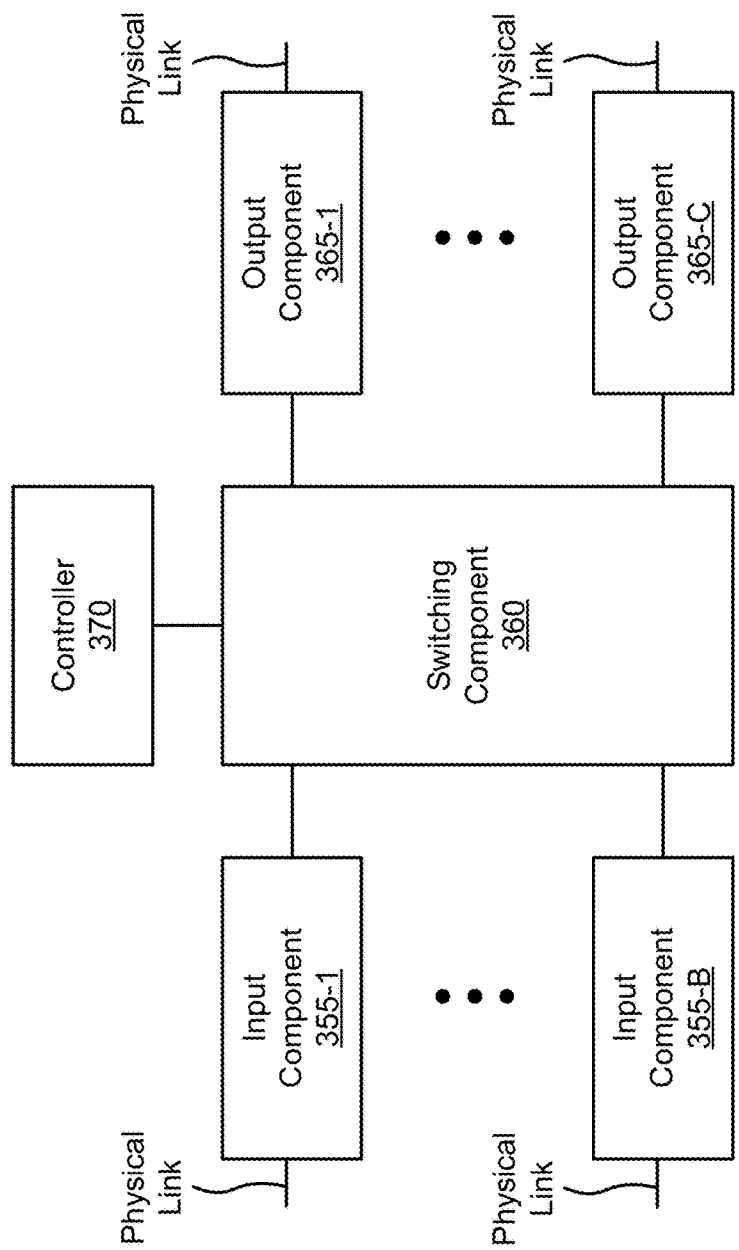

FIG. 3B is a diagram of example components of a device 350. Device 350 may correspond to network nodes 210. In some implementations, network node 210 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C(C≥1) (hereinafter referred to collectively as output components 365, and individually as output component 365), and a controller 370.

Input components 355 may be points of attachment for physical links and may be points of entry for incoming traffic, such as packets. Input components 355 may process incoming traffic, such as by performing data link layer encapsulation or decapsulation. In some implementations, input components 355 may send and/or receive packets. In some implementations, input components 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, and/or the like) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
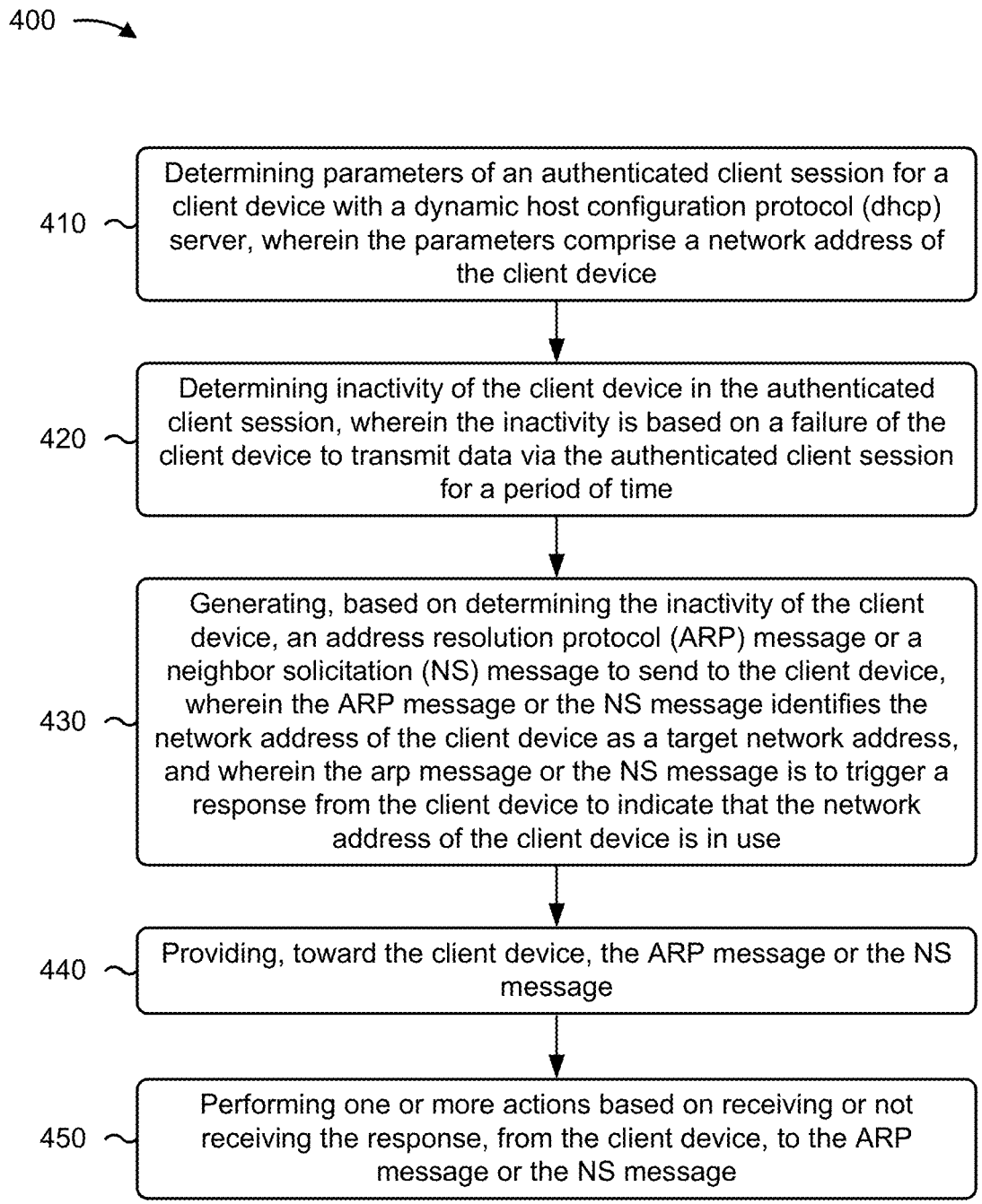

FIG. 4 is a flow chart of an example process 400 for liveness detection for an authenticated client session. In some implementations, one or more process blocks of FIG. 4 may be performed by a network node (e.g., network node 210). In some implementations, one or more process blocks of FIG. 4 may be performed by another device or a group of devices separate from or including the network node, such as radius server (e.g., the radius server 230), a DHCP server (e.g., DHCP server 240), and/or the like.

As shown in FIG. 4, process 400 may include determining parameters of an authenticated client session for a client device with a dynamic host configuration protocol (DHCP) server, wherein the parameters comprise a network address of the client device (block 410). For example, the network node (e.g., using processor 310, memory 315, storage component 320, input component 325, output component 330, communication interface 335, controller 370, and/or the like) may determine parameters of an authenticated client session for a client device with a DHCP server, as described above. In some implementations, the parameters comprise a network address of the client device.

As further shown in FIG. 4, process 400 may include determining inactivity of the client device in the authenticated client session, wherein the inactivity is based on a failure of the client device to transmit data via the authenticated client session for a period of time (block 420). For example, the network node (e.g., using processor 310, memory 315, storage component 320, input component 325, output component 330, communication interface 335, controller 370, and/or the like) may determine inactivity of the client device in the authenticated client session, as described above. In some implementations, the inactivity is based on a failure of the client device to transmit data via the authenticated client session for a period of time.

As further shown in FIG. 4, process 400 may include generating, based on determining the inactivity of the client device, an ARP message or an NS message to send to the client device, wherein the ARP message or the NS message identifies the network address of the client device as a target network address, and wherein the ARP message or the NS message is to trigger a response from the client device to indicate that the network address of the client device is in use (block 430). For example, the network node (e.g., using processor 310, memory 315, storage component 320, input component 325, output component 330, communication interface 335, controller 370, and/or the like) may generate, based on determining the inactivity of the client device, an ARP message or an NS message to send to the client device, as described above. In some implementations, the ARP message or the NS message identifies the network address of the client device as a target network address. In some implementations, the ARP message or the NS message is to trigger a response from the client device to indicate that the network address of the client device is in use.

As further shown in FIG. 4, process 400 may include providing, toward the client device, the ARP message or the NS message (block 440). For example, the network node (e.g., using processor 310, memory 315, storage component 320, input component 325, output component 330, communication interface 335, controller 370, and/or the like) may provide, toward the client device, the ARP message or the NS message, as described above.

As further shown in FIG. 4, process 400 may include performing one or more actions based on receiving or not receiving the response, from the client device, to the ARP message or the NS message (block 450). For example, the network node (e.g., using processor 310, memory 315, storage component 320, input component 325, output component 330, communication interface 335, controller 370, and/or the like) may perform one or more actions based on receiving or not receiving the response, from the client device, to the ARP message or the NS message, as described above.

Process 400 may include additional implementations, such as any single implementation or any combination of implementations described below and/or in connection with one or more other processes described elsewhere herein.

In a first implementation, the network node supports an 802.1x protocol, the client device does not support the 802.1x protocol, and the network node facilitates authentication of the client device via a radius server.

In a second implementation, alone or in combination with the first implementation, the network node receives the response, from the client device, to the ARP message or the NS message and, based on receiving the response, the one or more actions comprise maintaining the parameters of the authenticated client session in one or more of a filtering data structure, a forwarding data structure, or a Media Access Control (MAC) radius data structure of the network node.

In a third implementation, alone or in combination with one or more of the first and second implementations, the network node does not receive the response for a predetermined amount of time, from the client device, to the ARP message or the NS message and, based on not receiving the response for the predetermined amount of time, the one or more actions comprise removing the parameters of the authenticated client session from one or more of a filtering data structure, a forwarding data structure, or a MAC radius data structure of the network node.

In a fourth implementation, alone or in combination with one or more of the first through third implementations, the client device comprises one or more of: an 801.1x client device, a captive portal client device, or a MAC-radius client device.

In a fifth implementation, alone or in combination with one or more of the first through fourth implementations, process 400 further comprises receiving, from a radius server, a vendor-specific attribute message that instructs the network node to provide the ARP message or the NS message based on determining the inactivity of the client device.

In a sixth implementation, alone or in combination with one or more of the first through fifth implementations, the network node determines the parameters of the authenticated client session for the client device via DHCP snooping or stateless address auto-configuration snooping.

In a seventh implementation, alone or in combination with one or more of the first through sixth implementations, a network layer protocol associated with the network address of the client device is Internet Protocol version 4 (IPv4) and generating the ARP message or the NS message comprises generating the ARP message based on determining that the network layer protocol associated with the network address of the client device is IPv4.

In an eighth implementation, alone or in combination with one or more of the first through seventh implementations, a network layer protocol associated with the network address of the client device is Internet Protocol version 6 (IPv6) and generating the ARP message or the NS message comprises generating the NS message based on determining that the network layer protocol associated with the network address of the client device is IPv6.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for liveness detection for an authenticated client session. In some implementations, one or more process blocks of FIG. 5 may be performed by a network node (e.g., network node 210). In some implementations, one or more process blocks of FIG. 5 may be performed by another device or a group of devices separate from or including the network node, such as radius server (e.g., the radius server 230), a DHCP server (e.g., DHCP server 240), and/or the like.

As shown in FIG. 5, process 500 may include determining parameters of an authenticated client session for a client device with a DHCP server, wherein the parameters comprise a network address of the client device and an indication of a network layer protocol of the authenticated client session (block 510). For example, the network node (e.g., using processor 310, memory 315, storage component 320, input component 325, output component 330, communication interface 335, controller 370, and/or the like) may determine parameters of an authenticated client session for a client device with a DHCP server, as described above. In some implementations, the parameters comprise a network address of the client device and an indication of a network layer protocol of the authenticated client session.

As further shown in FIG. 5, process 500 may include generating, based on the indication of the network layer protocol of the authenticated client session, an ARP message to send to the client device, wherein the ARP message identifies the network address of the client device as a target network address, and wherein the ARP message is to trigger a response from the client device to indicate that the network address of the client device is in use (block 520). For example, the network node (e.g., using processor 310, memory 315, storage component 320, input component 325, output component 330, communication interface 335, controller 370, and/or the like) may generate, based on the indication of the network layer protocol of the authenticated client session, an ARP message to send to the client device, as described above. In some implementations, the ARP message identifies the network address of the client device as a target network address. In some implementations, the ARP message is to trigger a response from the client device to indicate that the network address of the client device is in use.

As further shown in FIG. 5, process 500 may include providing, to the client device, repetitions of the ARP message at a periodicity having a period that is less than an age-out period, wherein the age-out period corresponds to an amount of time of inactivity after which the one or more processors are to remove the parameters of the authenticated client session (block 530). For example, the network node (e.g., using processor 310, memory 315, storage component 320, input component 325, output component 330, communication interface 335, controller 370, and/or the like) may provide, to the client device, repetitions of the ARP message at a periodicity having a period that is less than an age-out period, as described above. In some implementations, the age-out period corresponds to an amount of time of inactivity after which the one or more processors are to remove the parameters of the authenticated client session.

As further shown in FIG. 5, process 500 may include performing one or more actions based on a receipt of, or a failure to receive, the response to the ARP message from the client device (block 540). For example, the network node (e.g., using processor 310, memory 315, storage component 320, input component 325, output component 330, communication interface 335, controller 370, and/or the like) may perform one or more actions based on a receipt of, or a failure to receive, the response to the ARP message from the client device, as described above.

Process 500 may include additional implementations, such as any single implementation or any combination of implementations described below and/or in connection with one or more other processes described elsewhere herein.

In a first implementation, the period of the periodicity of the repetitions of the ARP message is less than half of the age-out period, and process 500 further includes providing two or more of the repetitions of the ARP message within a particular age-out period.

In a second implementation, alone or in combination with the first implementation, process 500 further includes, based on a receipt of the response, from the client device, to at least one of two or more of the repetitions of the ARP message, maintaining the parameters of the authenticated client session in one or more of a filtering data structure, a forwarding data structure, or a MAC-radius data structure of the network node.

In a third implementation, alone or in combination with one or more of the first and second implementations, process 500 further includes, based on the failure to receive the response, from the client device, to any of the two or more of the repetitions of the ARP message, removing the parameters of the authenticated client session from one or more of a filtering data structure, a forwarding data structure, or a MAC-radius data structure of the network node.

In a fourth implementation, alone or in combination with one or more of the first through third implementations, the network node supports an 802.1x protocol, the client device does not support the 802.1x protocol, and process 500 further includes facilitating authentication of the client device via a radius server.

In a fifth implementation, alone or in combination with one or more of the first through fourth implementations, process 500 further includes receiving, from a radius server, a vendor-specific attribute message that instructs the network node to provide, to the client device, the repetitions of the ARP message at the periodicity.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
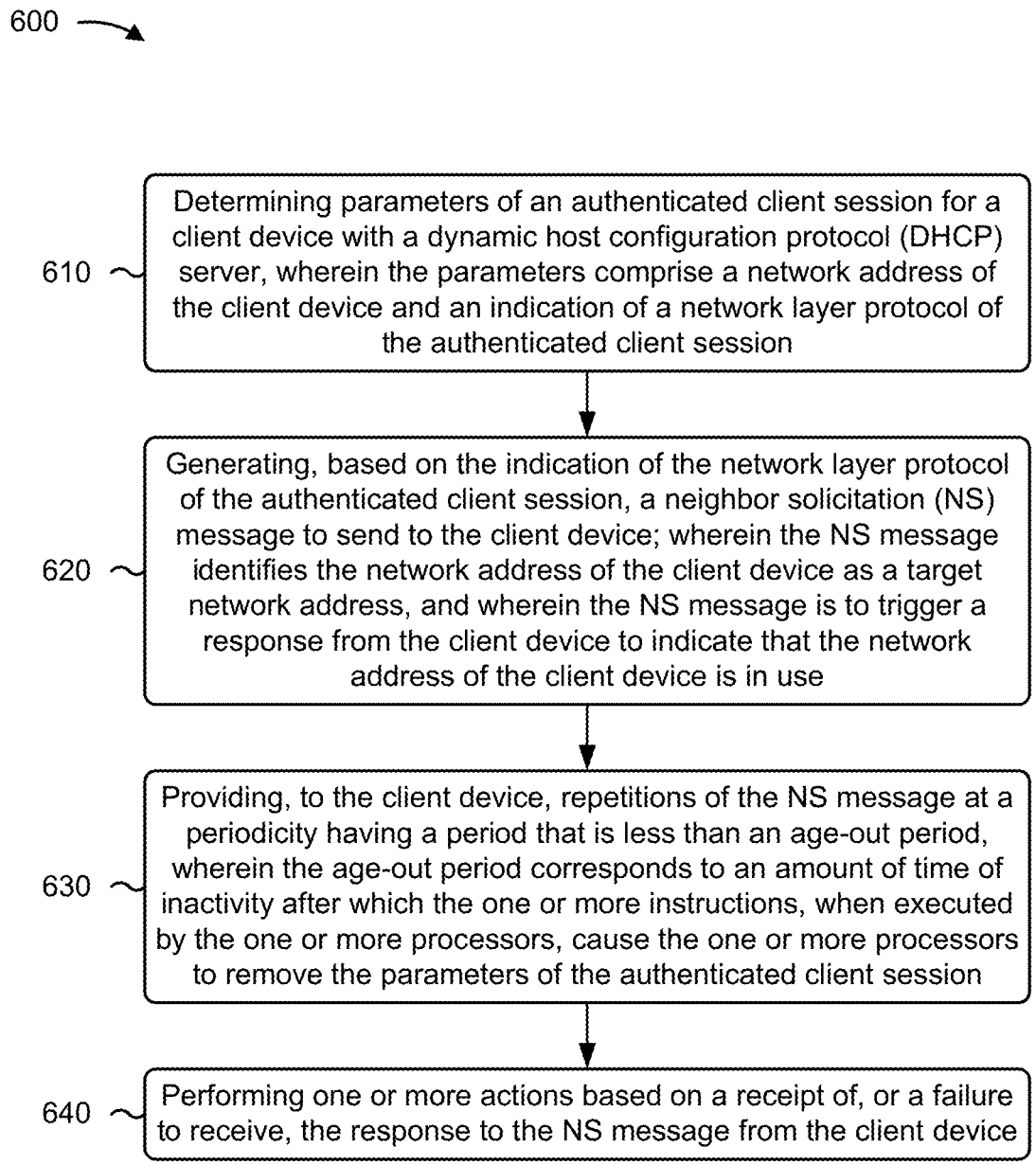

FIG. 6 is a flow chart of an example process 600 for liveness detection for an authenticated client session. In some implementations, one or more process blocks of FIG. 6 may be performed by a network node (e.g., network node 210). In some implementations, one or more process blocks of FIG. 6 may be performed by another device or a group of devices separate from or including the network node, such as radius server (e.g., the radius server 230), a DHCP server (e.g., DHCP server 240), and/or the like.

As shown in FIG. 6, process 600 may include determining parameters of an authenticated client session for a client device with a DHCP server, wherein the parameters comprise a network address of the client device and an indication of a network layer protocol of the authenticated client session (block 610). For example, the network node (e.g., using processor 310, memory 315, storage component 320, input component 325, output component 330, communication interface 335, controller 370, and/or the like) may determine parameters of an authenticated client session for a client device with a DHCP server, as described above. In some implementations, the parameters comprise a network address of the client device and an indication of a network layer protocol of the authenticated client session.

As further shown in FIG. 6, process 600 may include generating, based on the indication of the network layer protocol of the authenticated client session, an NS message to send to the client device, wherein the NS message identifies the network address of the client device as a target network address, and wherein the NS message is to trigger a response from the client device to indicate that the network address of the client device is in use (block 620). For example, the network node (e.g., using processor 310, memory 315, storage component 320, input component 325, output component 330, communication interface 335, controller 370, and/or the like) may generate, based on the indication of the network layer protocol of the authenticated client session, an NS message to send to the client device, as described above. In some implementations, the NS message identifies the network address of the client device as a target network address. In some implementations, the NS message is to trigger a response from the client device to indicate that the network address of the client device is in use.

As further shown in FIG. 6, process 600 may include providing, to the client device, repetitions of the NS message at a periodicity having a period that is less than an age-out period, wherein the age-out period corresponds to an amount of time of inactivity after which the parameters of the authenticated client session are to be removed (block 630). For example, the network node (e.g., using processor 310, memory 315, storage component 320, input component 325, output component 330, communication interface 335, controller 370, and/or the like) may provide, to the client device, repetitions of the NS message at a periodicity having a period that is less than an age-out period, as described above. In some implementations, the age-out period corresponds to an amount of time of inactivity after which the parameters of the authenticated client session are to be removed.

As further shown in FIG. 6, process 600 may include performing one or more actions based on a receipt of, or a failure to receive, the response to the NS message from the client device (block 640). For example, the network node (e.g., using processor 310, memory 315, storage component 320, input component 325, output component 330, communication interface 335, controller 370, and/or the like) may perform one or more actions based on a receipt of, or a failure to receive, the response to the NS message from the client device, as described above.

Process 600 may include additional implementations, such as any single implementation or any combination of implementations described below and/or in connection with one or more other processes described elsewhere herein.

In a first implementation, process 600 further includes, based on the receipt of the response, from the client device, to at least one of the repetitions of the NS message provided within the age-out period, maintaining the parameters of the authenticated client session in one or more of a filtering data structure, a forwarding data structure, or a MAC-radius data structure.

In a second implementation, alone or in combination with the first implementation, process 600 further includes, based on the failure to receive the response, from the client device, to any of the repetitions of the NS message, removing the parameters of the authenticated client session from one or more of a filtering data structure, a forwarding data structure, or a MAC-radius data structure.

In a third implementation, alone or in combination with one or more of the first and second implementations, the client device comprises one or more of: an 801.1x client device, a captive portal client device, or a MAC-radius client device.

In a fourth implementation, alone or in combination with one or more of the first through third implementations, process 600 further includes determining the parameters of the authenticated client session via DHCP snooping or stateless address auto-configuration snooping.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
maintaining, by a network node, parameters of an authenticated client session for a client device with a dynamic host configuration protocol (DHCP) server,
wherein the parameters include instructions for providing an address resolution protocol (ARP) message or a neighbor solicitation (NS) message to trigger a response from the client device before removing the parameters,
wherein the instructions include a vendor specific attribute (VSA) that specifies a periodicity at which to trigger the ARP message or the NS message;
determining, by the network node, inactivity of the client device in the authenticated client session;
providing, by the network node and based on the inactivity of the client device and the instructions, the ARP message or the NS message to trigger the response from the client device; and
maintaining, by the network node and based on receiving the response from the client device, the parameters in a data structure of the network node.

2. The method of claim 1, wherein the parameters are maintained in one or more of:
a filtering data structure,
a forwarding data structure, or
a media access control (MAC) radius data structure.

3. The method of claim 1, wherein determining the inactivity of the client device comprises:
determining that an amount of time since a transmission by the client device has exceeded a threshold period.

4. The method of claim 1, wherein the parameters comprise one or more of:
a time of authentication, or
a media access control (MAC) address of the authenticated client session.

5. The method of claim 1, wherein the parameters include instructions from a particular VSA associated with the client device, and
wherein providing the ARP message or the NS message is based on conditions configured via the VSA.

6. The method of claim 1, wherein the response includes a network address of the client device, and
wherein maintaining the parameters based on receiving the response from the client device is based on identifying the client device using the network address of the client device.

7. The method of claim 1, further comprising:
providing one or more additional ARP messages or one or more additional NS messages to the client device.

8. A non-transitory computer-readable medium storing a set of instructions, the set of instructions comprising:
one or more instructions that, when executed by one or more processors of a network node, cause the network node to:
maintain parameters of an authenticated client session for a client device with a dynamic host configuration protocol (DHCP) server,
wherein the parameters include particular instructions for providing an address resolution protocol (ARP) message or a neighbor solicitation (NS) message to trigger a response from the client device before removing the parameters,
wherein the particular instructions include a vendor specific attribute (VSA) that specifies a periodicity at which to trigger the ARP message or the NS message;
determine inactivity of the client device in the authenticated client session;
provide, based on the inactivity of the client device and the particular instructions, the ARP message or the NS message to trigger the response from the client device; and
maintain, based on receiving the response from the client device, the parameters in a data structure of the network node.

9. The non-transitory computer-readable medium of claim 8, wherein the parameters are maintained in one or more of:
a filtering data structure,
a forwarding data structure, or
a media access control (MAC) radius data structure.

10. The non-transitory computer-readable medium of claim 8, wherein the one or more instructions, that cause the network node to determine the inactivity of the client device, cause the network node to:
determine that an amount of time since a transmission by the client device has exceeded a threshold period.

11. The non-transitory computer-readable medium of claim 8, wherein the parameters comprise one or more of:

a time of authentication, or a media access control (MAC) address of the authenticated client session.

12. The non-transitory computer-readable medium of claim 8, wherein the parameters include instructions from a particular VSA associated with the client device, and wherein providing the ARP message or the NS message is based on conditions configured via the VSA.

13. The non-transitory computer-readable medium of claim 8, wherein the response includes a network address of the client device, and wherein maintaining the parameters based on receiving the response from the client device is based on identifying the client device using the network address of the client device.

14. The non-transitory computer-readable medium of claim 8, wherein the one or more instructions further cause the network node to:

provide one or more additional ARP messages or one or more additional NS messages to the client device.

15. A network node, comprising:

one or more memories; and one or more processors to:

maintain parameters of an authenticated client session for a client device with a dynamic host configuration protocol (DHCP) server, wherein the parameters include particular instructions for providing an address resolution protocol (ARP) message or a neighbor solicitation (NS) message to trigger a response from the client device before removing the parameters, wherein the particular instructions include a vendor specific attribute (VSA) that specifies a periodicity at which to trigger the ARP message or the NS message;

determine inactivity of the client device in the authenticated client session;

provide, based on the inactivity of the client device and the particular instructions, the ARP message or the NS message to trigger the response from the client device; and maintain, based on receiving the response from the client device, the parameters in a data structure of the network node.

16. The network node of claim 15, wherein the parameters are maintained in one or more of:

a filtering data structure, a forwarding data structure, or a media access control (MAC) radius data structure.

17. The network node of claim 15, wherein the one or more processors, to determine the inactivity of the client device, are to:

determine that an amount of time since a transmission by the client device has exceeded a threshold period.

18. The network node of claim 15, wherein the parameters comprise one or more of:

a time of authentication, or a media access control (MAC) address of the authenticated client session.

19. The network node of claim 15, wherein the parameters include instructions from a particular VSA associated with the client device, and wherein providing the ARP message or the NS message is based on conditions configured via the VSA.

20. The network node of claim 15, wherein the response includes a network address of the client device, and wherein maintaining the parameters based on receiving the response from the client device is based on identifying the client device using the network address of the client device.

* * * * *